US012572828B2

(12) United States Patent
Fang et al.

(10) Patent No.:   US 12,572,828 B2
(45) Date of Patent:      Mar. 10, 2026

(54) METHOD FOR INDUSTRY TEXT INCREMENT AND ELECTRONIC DEVICE

(71) Applicant: Beijing Baidu Netcom Science and Technology Co., Ltd., Beijing (CN)

(72) Inventors: Zhou Fang, Beijing (CN); Yabing Shi, Beijing (CN); Ye Jiang, Beijing (CN); Chunguang Chai, Beijing (CN)

(73) Assignee: BEIJING BAIDU NETCOM SCIENCE AND TECHNOLOGY CO., LTD., Beijing (CN)

( * ) Notice:   Subject to any disclaimer, the term of this patent is extended or adjusted under 35 U.S.C. 154(b) by 1080 days.

(21) Appl. No.: 17/493,365

(22) Filed:   Oct. 4, 2021

(65) Prior Publication Data

US 2022/0027766 A1      Jan. 27, 2022

(30) Foreign Application Priority Data

Feb. 19, 2021   (CN) ......................... 202110189733.4

(51) Int. Cl.
  *G06N 5/04*        (2023.01)
  *G06N 20/00*      (2019.01)
(52) U.S. Cl.
  CPC .............. *G06N 5/04* (2013.01); *G06N 20/00* (2019.01)
(58) Field of Classification Search
None
See application file for complete search history.

(56)                  References Cited

U.S. PATENT DOCUMENTS 11,734,937 B1 *   8/2023   Pushkin .............. G06F 18/2155
                                                          706/12
2016/0132357 A1    5/2016   Kuraishi et al.
2020/0372395 A1   11/2020   Mahmud et al.
                   (Continued)

FOREIGN PATENT DOCUMENTS

CN          107145503 A       9/2017
CN          108984683 A      12/2018
                   (Continued)

OTHER PUBLICATIONS

Q. Wang, Z. Mao, B. Wang and L. Guo, "Knowledge Graph Embedding: A Survey of Approaches and Applications," Dec. 1, 2017, in IEEE Transactions on Knowledge and Data Engineering, vol. 29, No. 12, pp. 2724-2743 (Year: 2017).*

(Continued)

*Primary Examiner* — Michael J Huntley
*Assistant Examiner* — Kaitlyn R Haefner
(74) *Attorney, Agent, or Firm* — Seed Intellectual Property Law Group LLP

(57)                  ABSTRACT

A method for an industry text increment, as well as an electronic device and a computer readable storage medium for the same are provided. The method may include: acquiring an original industry text in a target industry field, an order of magnitude of a number of the original industry text being smaller than a preset first order of magnitude; and performing a sample incremental processing on the original industry text by using a distant supervision method, to obtain increased industry texts, an order of magnitude of a number of the increased industry texts is greater than a preset second order of magnitude, wherein the preset second order of magnitude is not smaller than the preset first order of magnitude.

11 Claims, 4 Drawing Sheets

(56) References Cited

U.S. PATENT DOCUMENTS

| | | | | |
|---|---|---|---|---|
| 2022/0198149 | A1* | 6/2022 | Wu ........................ | G06F 40/284 |
| 2022/0245362 | A1* | 8/2022 | Nizar ..................... | G06F 40/216 |
| 2023/0153526 | A1* | 5/2023 | Wang ..................... | G06N 3/084 |
| | | | | 704/9 |

FOREIGN PATENT DOCUMENTS

| | | | |
|---|---|---|---|
| CN | 109086660 | A | 12/2018 |
| CN | 109101583 | A | 12/2018 |
| CN | 109284396 | A | 1/2019 |
| CN | 111241813 | A | 6/2020 |
| CN | 111339407 | A | 6/2020 |
| CN | 111597795 | A | 8/2020 |
| CN | 111651614 | A | 9/2020 |
| CN | 111831788 | A | 10/2020 |
| KR | 10-2020-0094627 | A | 8/2020 |
| KR | 10-2020-0096133 | A | 8/2020 |

OTHER PUBLICATIONS

Chinese Office Action for Chinese Application No. 202110189733. 4, dated May 11, 2022, 7 pages.
Extended European Search Report for European Application No. 21196648.6, dated Mar. 10, 2022, 28 pages.
Mintz et al., "Distant supervision for relation extraction without labeled data," Proceedings of the 47th Annual Meeting of the ACL and the 4th IJCNLP of the AFNLP, Aug. 2-7, 2009, pp. 1003-1011.
Shleifer, "Low Resource Text Classification with ULMFit and Backtranslation," Cornell University Library, 2018, 9 pages.

* cited by examiner

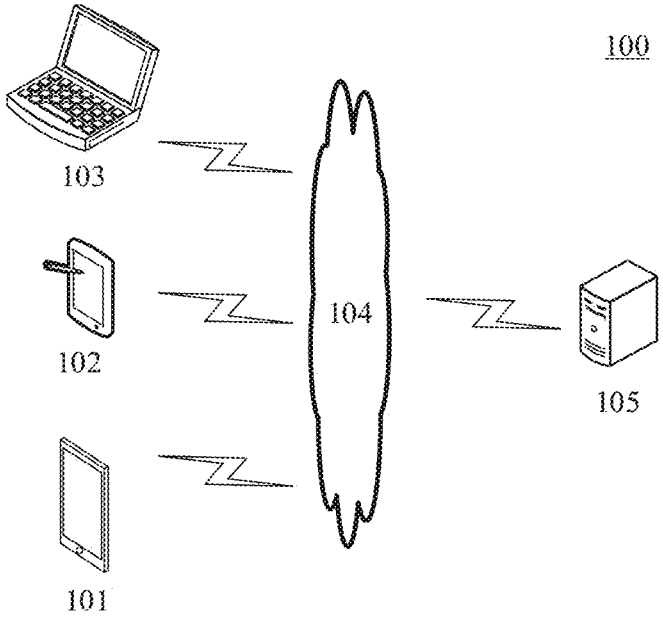

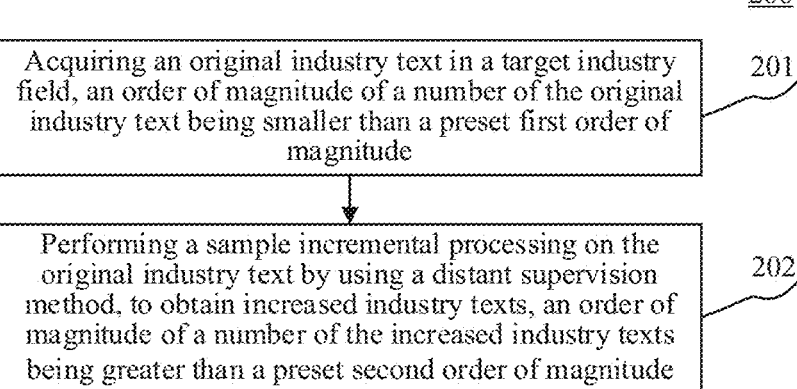

Acquiring an original industry text in a target industry field, an order of magnitude of a number of the original industry text being smaller than a preset first order of magnitude

201

Performing a sample incremental processing on the original industry text by using a distant supervision method, to obtain increased industry texts, an order of magnitude of a number of the increased industry texts being greater than a preset second order of magnitude

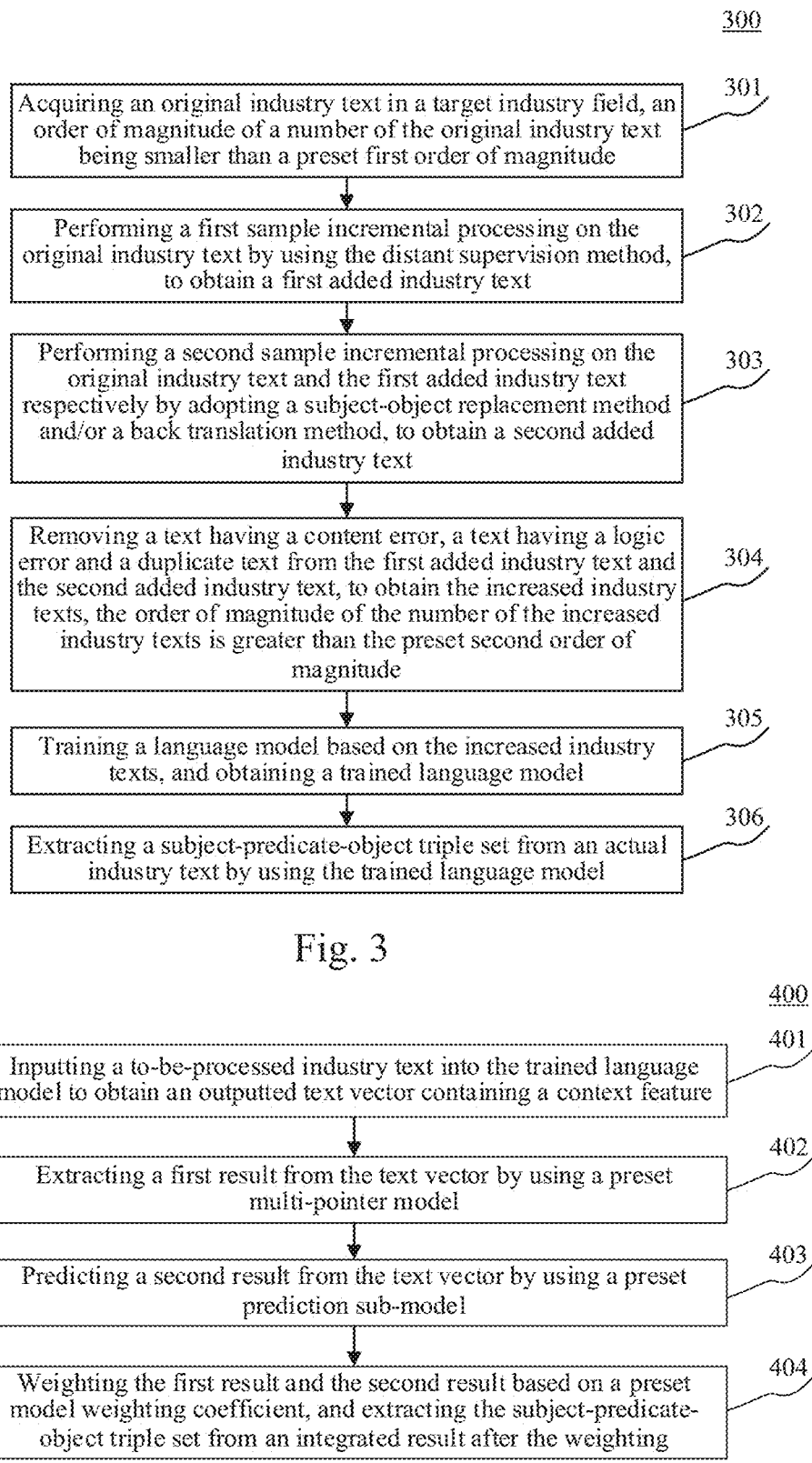

300

301 Acquiring an original industry text in a target industry field, an order of magnitude of a number of the original industry text being smaller than a preset first order of magnitude 302 Performing a first sample incremental processing on the original industry text by using the distant supervision method, to obtain a first added industry text 303 Performing a second sample incremental processing on the original industry text and the first added industry text respectively by adopting a subject-object replacement method and/or a back translation method, to obtain a second added industry text 304 Removing a text having a content error, a text having a logic error and a duplicate text from the first added industry text and the second added industry text, to obtain the increased industry texts, the order of magnitude of the number of the increased industry texts is greater than the preset second order of magnitude 305 Training a language model based on the increased industry texts, and obtaining a trained language model 306 Extracting a subject-predicate-object triple set from an actual industry text by using the trained language model

401 Inputting a to-be-processed industry text into the trained language model to obtain an outputted text vector containing a context feature 402 Extracting a first result from the text vector by using a preset multi-pointer model 403 Predicting a second result from the text vector by using a preset prediction sub-model 404 Weighting the first result and the second result based on a preset model weighting coefficient, and extracting the subject-predicate-object triple set from an integrated result after the weighting

Fig. 4

METHOD FOR INDUSTRY TEXT INCREMENT AND ELECTRONIC DEVICE

CROSS-REFERENCE TO RELATED APPLICATIONS

This application claims the priority of Chinese Patent Application No. 202110189733.4, titled "METHOD FOR INDUSTRY TEXT INCREMENT, RELATED APPARA-TUS, AND COMPUTER PROGRAM PRODUCT", filed on Feb. 19, 2021, the content of which is incorporated herein by reference in its entirety.

TECHNICAL FIELD

The present disclosure relates to the field of data process-ing technology, particularly to artificial intelligence technol-ogy such as deep learning, natural language processing, knowledge graph construction and smart question answer-ing, and specifically to a method for an industry text increment, as well as an electronic device and a computer readable storage medium for the same.

BACKGROUND

Information extraction technologies may be used to assist and fulfil the needs of smart question answering, smart customer services and the like that rely on information processing and information search. Benefiting from the development of artificial intelligence and deep learning, technologies on natural language processing such as infor-mation extraction have been developed rapidly in recent years. Unlike traditional machine learning models, deep learning models do not need to rely on manually defined advanced features. High accuracies and high recall rates of information extraction tasks can be achieved, only through basic features and by designing suitable deep learning model structures and performing training on large-scale labeled data.

SUMMARY

Embodiments of the present disclosure are directed to a method for an industry text increment, as well as an elec-tronic device and a computer readable storage medium for the same.

In a first aspect, an embodiment of the present disclosure provides a method for an industry text increment, including: acquiring an original industry text in a target industry field, an order of magnitude of a number of the original industry text being smaller than a preset first order of magnitude, wherein an industry text refers to a text content used to describe a specific object in a corresponding industry field; and performing a sample incremental processing on the original industry text by using a distant supervision method, to obtain increased industry texts, an order of magnitude of a number of the increased industry texts is greater than a preset second order of magnitude, where the preset second order of magnitude is not smaller than the preset first order of magnitude.

In a second aspect, an embodiment of the present disclo-sure provides an electronic device, including: at least one processor; and a storage device, communicated with the at least one processor, where the storage device stores instruc-tions executable by the at least one processor, and the instructions are executed by the at least one processor, to enable the at least one processor to perform the method for an industry text increment as described in any of the implementations of the first aspect.

In a third aspect, an embodiment of the present disclosure provides a non-transitory computer readable storage medium storing computer instructions, wherein the com-puter instructions are used to cause a computer to perform the method for an industry text increment as described in any of the implementations of the first aspect.

According to the method for an industry text increment, the electronic device and the computer readable storage medium that are provided in the embodiments of the present disclosure, the original industry text is first acquired in the target industry field, the order of magnitude of the number of the original industry text being smaller than the preset first order of magnitude, where the industry text refers to the text content used to describe the specific object in the corre-sponding industry field, and then the sample incremental processing is performed on the original industry text by using the methods including a distant supervision method, to obtain the increased industry texts, the order of magnitude of the number of the increased industry texts is greater than the preset second order of magnitude, where the preset second order of magnitude is not smaller than the preset first order of magnitude.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

After reading detailed descriptions for non-limiting embodiments given with reference to the following accom-panying drawings, other features, objectives and advantages of the present disclosure will be more apparent.

FIG. 1 illustrates an example system architecture to which the present disclosure may be applied;

FIG. 2 is a flowchart of a method for an industry text increment provided in an embodiment according to the present disclosure;

FIG. 3 is a flowchart of the method for an industry text increment provided in another embodiment according to the present disclosure;

FIG. 4 is a flowchart of a method for extracting a subject-predicate-object triple set provided in an embodi-ment according to the present disclosure;

DETAILED DESCRIPTION OF EMBODIMENTS

Figure 5:
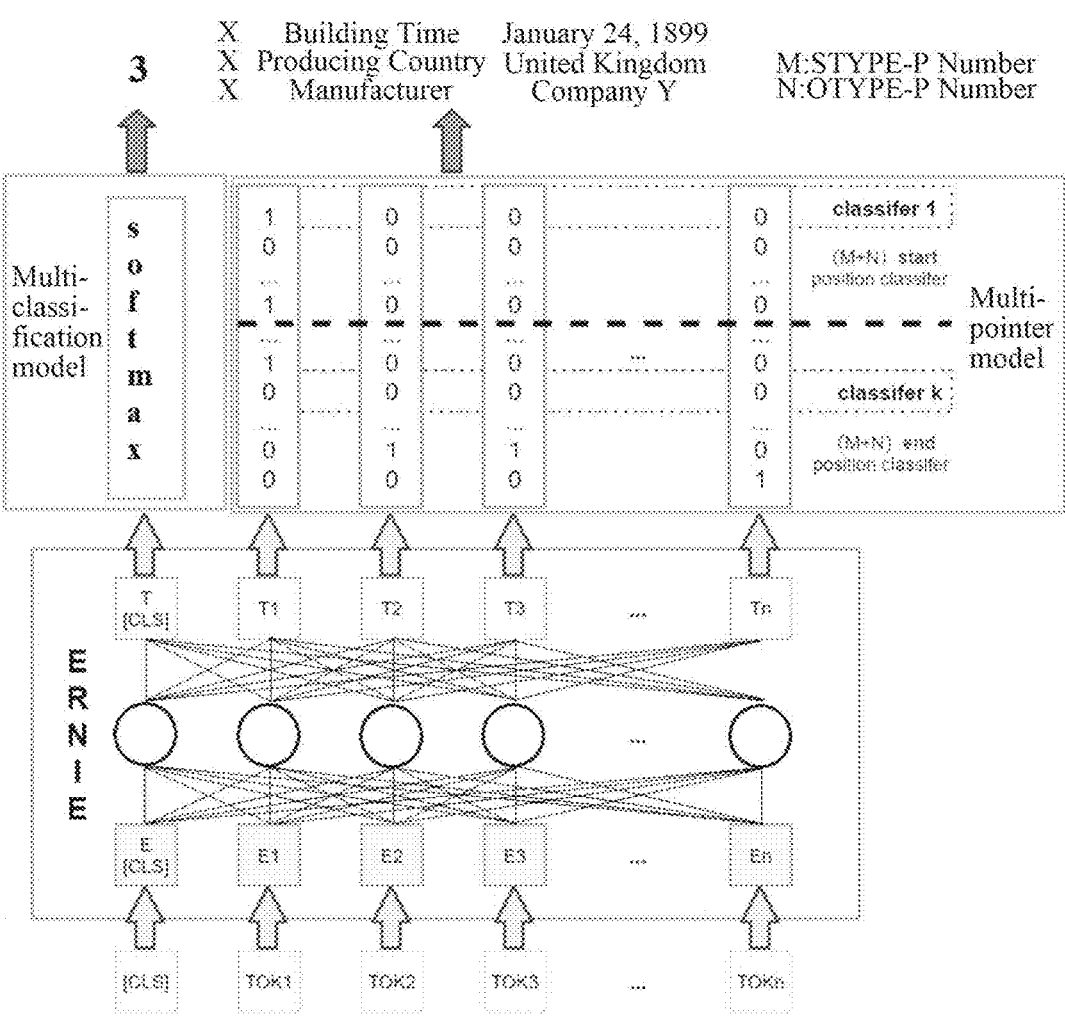
FIG. 5 is a schematic flow diagram of the method for an industry text increment in an application scenario, provided in an embodiment according to the present disclosure.

Example embodiments of the present disclosure are described below in combination with the accompanying drawings, and various details of the embodiments of the present disclosure are included in the description to facilitate understanding, and should be considered as examples only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description. It should be noted that the embodiments in the present disclosure and the features in the embodiments may be combined with each other on a non-conflict basis.

FIG. 1 illustrates an example system architecture 100 to which an embodiment of a method and apparatus for an industry text increment, an electronic device and a computer readable storage medium according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various applications (e.g., a sample incremental application, a text processing application, and an instant communication application) for implementing an information communication between the terminal devices 101, 102 and 103 and the server 105 may be installed on the terminal devices 101, 102 and 103 and the server 105.

The terminal devices 101, 102 and 103 and the server 105 may be hardware or software. When being the hardware, the terminal devices 101, 102 and 103 may be various electronic devices having a display screen, the electronic devices including, but not limited to, a smart phone, a tablet computer, a laptop portable computer, a desktop computer, and the like. When being the software, the terminal devices 101, 102 and 103 may be installed in the above listed electronic devices. The terminal devices may be implemented as a plurality of pieces of software or a plurality of software modules, or may be implemented as a single piece of software or a single software module, which is not specifically limited herein. When being the hardware, the server 105 may be implemented as a distributed server cluster composed of a plurality of servers, or may be implemented as a single server. When being the software, the server 105 may be implemented as a plurality of pieces of software or a plurality of software modules, or may be implemented as a single piece of software or a single software module, which is not specifically limited herein.

The server 105 may provide various services through various built-in applications. Taking a sample incremental application that may provide a sample incremental service for a text of a low-resource industry as an example, the server 105 may achieve the following effects when running the sample incremental application. First, an original industry text having a stock lower than a preset first order of magnitude in a target industry field, shared by the terminal devices 101, 102 and 103, is received through the network 104. The industry text refers to text content used to describe a specific object in a corresponding industry field. Then, a sample incremental processing is performed on the original industry text by using methods including a distant supervision method, to obtain increased industry texts, an order of magnitude of a number of the increased industry texts being greater than a preset second order of magnitude, where the preset second order of magnitude is not smaller than the preset first order of magnitude.

Further, after completing a sample incremental task through the above sample incremental application, the server 105 may further train, through the text processing application, a model for precisely extracting a subject-predicate-object triple set from a to-be-processed text, based on the increased industry texts.

It should be noted that, in addition to being acquired from the terminal devices 101, 102 and 103 through the network 104, the original industry text having the stock lower than the preset first order of magnitude in the target industry field may be stored locally in the server 105 in various ways. Accordingly, when detecting that the data is already stored locally (e.g., a to-be-processed sample incremental task stored before the processing starts), the server 105 may choose to directly acquire the data locally. In this situation, the terminal devices 101, 102 and 103 and the network 104 may not be provided in the example system architecture 100.

Since the sample incremental processing requires many computing resources and a strong computing capability, the method for an industry text increment provided in the subsequent embodiments of the present disclosure is generally performed by the server 105 having a strong computing capability and many computing resources. Correspondingly, the apparatus for an industry text increment is also generally provided in the server 105. At the same time, however, it should also be noted that, when having a computing capability and computing resources that meet requirements, the terminal devices 101, 102 and 103 may also perform, through the sample incremental application installed thereon, the above operations, which should have performed by the server 105, and then output the same result as that outputted by the server 105. In particular, in the situation where many kinds of terminal devices having different computing capabilities are present at the same time, when the sample incremental application determines that a terminal device on which the sample incremental application is installed has a strong computing capability and remains many computing resources, it may instruct the terminal device to perform the above operations, thereby appropriately reducing the computing pressure of the server 105. Correspondingly, the apparatus for an industry text increment may also be provided in the terminal devices 101, 102 and 103. In this situation, the server 105 and the network 104 may not be provided in the example system architecture 100.

It should be appreciated that the numbers of the terminal devices, the network, and the server in FIG. 1 are merely illustrative. Any number of terminal devices, networks, and servers may be provided based on actual requirements.

FIG. 2 is a flowchart of a method for an industry text increment provided in an embodiment of the present disclosure. In the flowchart of FIG. 2, the flow 200 includes the following steps 201 to 202.

Step 201 includes acquiring an original industry text having a stock lower than a preset first order of magnitude in a target industry field.

The purpose of this step is to acquire, by an executing body (e.g., the server 105 shown in FIG. 1) of the method for an industry text increment, the original industry text in the target industry field, the order of magnitude of the number of the original industry text being smaller than the preset first order of magnitude.

Here, the industry text refers to a text content used to describe a specific object in a corresponding industry field. The preset first order of magnitude, as a preset threshold value, is used to determine an industry field as a low-resource industry field if an industry text in this industry field currently has an actual order of magnitude smaller than the preset first order of magnitude. The low-resource industry field refers to an industry field in which, based on a conventional approach, a model having a precision meeting a desired requirement cannot be trained through a current order of magnitude of the number of original industry texts. The trained model may be used to perform an actual task, such as an entity recognition, an extraction of a subject-predicate-object triple set, and a semantic analysis, on an actual industry text.

Step 202 includes performing a sample incremental processing on the original industry text by using methods including a distant supervision method, to obtain increased industry texts, an order of magnitude of a number of the increased industry texts being greater than a preset second order of magnitude.

On the basis of step 201, the purpose of this step is to use, by the executing body, the distant supervision method as a sample incremental approach to perform the sample incremental processing on the original industry text with an order of magnitude not satisfying a first requirement, and finally obtain the increased industry texts and satisfying a second requirement.

Specifically, in the present disclosure, if an order of magnitude of the number of an original text is smaller than the preset first order of magnitude, it indicates that the first requirement is not satisfied. If an order of magnitude of the number of texts after the incremental processing is greater than the preset second order of magnitude, it indicates that the second requirement is satisfied. That is, the magnitude relationship between the preset first order of magnitude and the preset second order of magnitude is that the preset second order of magnitude is not smaller than the preset first order of magnitude. That is, a minimum preset second order of magnitude should be equal to the preset first order of magnitude. In this case, the preset first order of magnitude, as the threshold value, may be used to determine both whether the number of texts satisfies the first requirement and whether the number of texts satisfies the second requirement.

In order to change natural language information on a network into a structured form convenient for an analysis and processing, researchers propose different relationship extraction methods. A relationship extraction refers to detecting a clear or unclear relationship between entities from a text content and classifying the entities. From the perspective of sample acquisition of a machine learning, there are mainly three kinds of methods used for extracting a relationship fact from a text: fully supervised learning, semi-supervised learning and unsupervised learning. Here, the fully supervised learning refers to a learning in which initial sample data is manually labeled, the labeled data is then used to train a classifier, and finally, the trained classifier is used to recognize whether there are two certain entities having a certain relationship in one new sentence. A fully supervised learning method mainly includes a feature-based method and a kernel method. The semi-supervised learning refers to a learning in which a very small data seeding instance or pattern is used for guided learning to extract some new patterns from a large number of texts, these patterns are then used to extract a new instance, the new instance is used to extract a newer pattern, and these steps are repeated until data is finally obtained. The unsupervised learning refers to a learning in which an initial data set is not required, a character string between two entities is extracted from a large number of texts, and the character string is then aggregated and simplified to obtain a relationship character string.

With the advent of the era of big data, the relationship extraction task may be applied in broader and more complex technical fields. Facing massive and heterogeneous data, the researchers propose the distant supervision method. According to this method, the relationship extraction is completed by heuristically aligning a to-be-extracted relationship and a natural sentence. On the basis of this principle, the present disclosure further utilizes the characteristics of the distant supervision method to apply the distant supervision method to the sample increment on low-resource samples. The principle of the sample increment may be described with reference to an example of an extraction of a relationship among a location, country and capital. In a knowledge library, there is an instance (A, B). If there is a sentence "A is the capital of B . . . " in a text set, the system can automatically match the instance and the sentence by using the distant supervision method, to form a training instance {capital (A, B), A is the capital of B, . . . }, so that a new sentence may be formed through the training instance using another instance similar to the instance (A, B).

Specifically, in addition to the above emphasized distant supervision method, the sample incremental method may include another method through which similar effects are achieved by using another technical principle, such as, a synonym substitution method, a back translation method, and a random generation method. Whether to add other methods on the basis of the adoption of the distant supervision method may be selected according to the requirement in an actual application scenario, which is not to be specifically limited herein.

For the target industry field in which the order of magnitude of the number of the original industry text is lower than the preset first order of magnitude, according to the method for an industry text increment provided in the embodiment of the present disclosure, the sample increment is implemented by using the distant supervision method. Through the distant supervision method, a new text meeting the requirement can be found from another industry field or a public corpus according to an association between nouns in the original industry text, and the new text is used as an added text, thus the sample's magnitude is expanded. Accordingly, with the help of the sample incremental technology, a model used to precisely extract a subject-predicate-object triple set and having a precision satisfying a requirement can also be trained through the text of the low-resource target industry.

Referring to FIG. 3, FIG. 3 is a flowchart of the method for an industry text increment provided in another embodiment of the present disclosure. In the flowchart, the flow 300 includes the following steps 301 to 305.

Step 301 includes acquiring an original industry text having a stock lower than a preset first order of magnitude in a target industry field.

This step is consistent with step 201 shown in FIG. 2. For the content of step 301, reference is made to the corresponding part in the previous embodiment, which will not be repeatedly described herein.

Step 302 includes performing a first sample incremental processing on the original industry text by using a distant supervision method, to obtain a first added industry text.

A method for generating an added industry text in a way including, but not limited to, the distant supervision, may be as follows:

First, an initial subject-predicate-object triple set is extracted from the original industry text of the target industry field. Then, in another industry text of a non-target industry field and a public corpus, a text having a subject and a predicate of the initial subject-predicate-object triple set is determined as a target text. Finally, the target text is used as an added industry text of the original industry text distantly supervised.

Step 303 includes performing a second sample incremental processing on the original industry text and the first added industry text respectively by adopting a subject-object replacement method and/or a back translation method, to obtain a second added industry text.

Here, the subject-object replacement method refers to replacing the original subject and the original object with a new subject and a new object while maintaining the subject-object relationship provided by the predicate of the subject-predicate-object triple set. For a deeper understanding, reference is made to the following example:

A subject (abbreviated as S) dictionary and an object (abbreviated as O) dictionary which belong to the same category are obtained through the statistics for labeled training data. Taking a text of the ship industry as an example, the dictionaries may be obtained as follows: ships: M1, M2, M3 . . . ; and producing countries: A1, A2, A3 . . . . Accordingly, a plurality of new samples may be generated by randomly replacing the subject (S) and the object (O). An example is given below.

An original sample: M1 is a large commercial cargo ship of A1, and its full load displacement far exceeds those of other ships (S: M1; P: Producing Country; O: A1).

A new generated sample: M2 is a large commercial cargo ship of A2, and its full load displacement far exceeds those of other ships (S: M2; P: Country of origin; O: A2).

The back translation method refers to a method that a sentence is translated and re-translated, for example, from Chinese to English and then back to Chinese. Accordingly, a new sample having slight differences in expression may be obtained. That is, mainly through a slight distortion in the process of translating a sentence between different languages, a new sentence having a meaning identical to the original sentence or a new sentence different from the original sentence in expression is generated and then used as a sample.

Step 304 includes removing a text having a content error, a text having a logic error and a duplicate text from the first added industry text and the second added industry text, to obtain the increased industry texts, the order of magnitude of the number of the increased industry texts is greater than the preset second order of magnitude.

On the basis of step 302, regardless of whether the subject-object replacement method, the back translation method or the distant supervision method is used, various errors in the new sample generated through the incremental processing may be caused, especially after the second incremental operation is performed based on the distant supervision. Therefore, the purpose of this step is to remove, by the executing body, a text having content error, a text having logic error and/or a duplicate text from the first added industry text and the second added industry text, so as to obtain the increased industry texts being as available as possible.

Further, if the order of magnitude of the number of the increased industry texts after the text having the content error, the text having the logic error and the duplicate text are removed, is not greater than the preset second order of magnitude, an incremental processing may be performed on the increased industry texts again according to the above incremental method, until the order of magnitude of the number of the texts is greater than the preset second order of magnitude. Clearly, if the incremental processing is subsequently performed again on the basis of the increased industry texts, a stricter check should be performed, to ensure the reliability of a subsequently trained model based on the principle of maintaining the availability of the sample.

Step 305 includes training a language model based on the increased industry texts, and obtaining a trained language model.

Based on step 304, the purpose of this step is to train an initial language model by using the increased industry texts as training samples, to finally obtain the trained language model.

Specifically, according to specific requirements, the initial language model may be selected from language model frameworks having different characteristics to take part in the training, and an activation function and a loss function may also be adjusted by themselves according to actual corpus characteristics and requirement characteristics, which is not specifically limited herein.

Step 306 includes extracting a subject-predicate-object triple set from an actual industry text by using the trained language model.

On the basis of step 305, the purpose of this step is to extract, by the executing body, the subject-predicate-object triple set from the actual industry text by using the trained language model. It should be understood that the subject-predicate-object triple set (abbreviated as "SPO triple set") is generally extracted in a unit of sentence. That is, one SPO triple set should be able to be extracted from one sentence, and the SPO triple set extracted from the sentence generally exists as the core of the content to be expressed by the sentence. Accordingly, the key content can be expressed concisely, and the influence of another content can be eliminated in this way. Meanwhile, it also facilitates performing kinds of structured processing on the content of the industry text directly through the corresponding relationship in the SPO triple set.

Different from the previous embodiment, this embodiment provides, through steps 302-303, a specific approach to performing the sample incremental processing and processing the increased samples again, to obtain sufficient and effective increased samples as quickly as possible through as many approaches as possible. In addition, this embodiment provides, through steps 304-305, a scheme in which the increased samples are used to train a model and the trained model is used to implement an extraction schema for the SPO triple set of an industry text, so that the scheme may play a practical role in a specific application scenario as far as possible thereby improving the accuracy of the extraction of the SPO triple set.

In the previous embodiment, the scheme in which the language model is trained based on the increased industry texts is given. In addition to the increased industry texts that are used as the training samples, a conventional approach is adopted in the model training phase. However, given that the conventional approach is designed based on that the number of real samples satisfy the order of magnitude, a conventional training approach may not directly achieve the same effect (i.e., generally referring to a model precision) on the increased industry texts. Therefore, for the present situation where an actual industry text contains a complex nested relationship, the present disclosure provides, through FIG. 4, a model training and SPO triple set extraction scheme, which is more suitable for such a low-resource sample situation. The flow 400 of the scheme includes the following steps 401 to 404.

Step 401 includes inputting a to-be-processed industry text into a trained language model to obtain an outputted text vector containing a context feature.

In this embodiment, the role of the language model trained based on the increased industry texts is to represent a relationship between a to-be-processed industry text and a text vector containing a context feature. Therefore, the trained language model is capable of outputting the text vector containing the context feature.

Step 402 includes extracting a first result from the text vector by using a preset multi-pointer model.

The multi-pointer model represents a corresponding relationship between a text vector and start and end positions of a relationship pair having a multi-layer nested relationship and existing in the text vector.

Step 403 includes predicting a second result from the text vector by using a preset prediction sub-model.

Here, the prediction sub-model is used to predict at least one of a number of predicate categories, a number of subject-predicate-object triple sets and/or an entity type that are contained in the to-be-processed industry text, according to a labeled label category.

Step 404 includes weighting the first result and the second result based on a preset model weighting coefficient, and extracting a subject-predicate-object triple set from an integrated result after the weighting.

According to the technical solution provided in steps 401-404 in this embodiment, the preset sub-model is additionally provided on the basis of the conventional adaptation of the multi-pointer model used by relationship pairs in the industry text that have a complex nested relationship, so as to integrate the result of the multi-pointer model in combination with the prediction of the sub-model for the at least one of the number of the predicate categories, the number of the subject-predicate-object triple sets and/or the entity type that are contained in the industry text. The integration process is essentially a process of a mutual verification for the improvement of an accuracy, thus making the subject-predicate-object triple set extracted from the integrated result more accurate.

On the basis of the previous embodiments providing the technical solution for extracting the subject-predicate-object triple set, a knowledge graph of the target industry field may be further constructed according to the extracted subject-predicate-object triple set, to satisfy a subsequent knowledge-graph-based requirement, such as a knowledge query and smart question answering. For example, in response to receiving a knowledge query request, an actual industry field to which the knowledge query request belongs is determined according to the knowledge query request; and a knowledge graph of the actual industry field is invoked to perform a query, and target knowledge corresponding to the knowledge query request is fed back.

For a deeper understanding, the present disclosure further provides a specific implementation in combination with a specific application scenario. Referring to the schematic diagram shown in FIG. 5:

1) a server receives a to-be-processed industry text "the building of X was started by the company Z of Country Y on Jan. 24, 1899" (it can be seen that the industry is the shipbuilding industry);

2) the server adds [CLS] (Class) to the beginning of the to-be-processed industry text at an input layer, to represent a classification feature; and 3) the server inputs the to-be-processed industry text that is processed into a pre-trained language model (equivalent to the language model shown in the embodiment of FIG. 4) to obtain an outputted text vector.

A pre-trained language model ERNIE and parameters are specifically used in FIG. 5. This model converts the inputted to-be-processed industry text into a text vector containing a context feature. Here, a transformer (transformation) unit is mainly used. In the model, there may be a plurality of layers of transformer units. Each transformer unit at each layer corresponds to one unit in an input. The transformer units at the same layer are not connected to each other. The transformer units of different layers are connected in pairs (FIG. 5 only schematically shows the connection of transformers of two layers).

4) The server inputs the outputted text vector into a pre-trained multi-pointer model (equivalent to the multi-pointer model shown in FIG. 4), to output start and end positions of relationship pairs that are multi-layer nested.

According to a predefined schema, a total of 2(M+N) classifiers are generated. Here, M is the number of stype-p (which may be equivalently understood as "first-layer relationship pair") pairs. Here, each stype-p corresponds to two classifiers, which are respectively used to learn a start position and an end position of an entity conforming to a stype-p schema. Likewise, each otype-p (which may be equivalently understood as "second-layer relationship pair") also corresponds to two classifiers, which are respectively used to learn a start position and an end position of an attribute value conforming to an otype-p schema. As shown in FIG. 5, for example, a first classifier may indicate that the first token of a text is a start position of an entity of Ship-Manufacturer, and a second classifier may indicate that the third token of the text is an end position of the entity of Ship-Manufacturer. A k-th classifier may indicate that the 18-th token of the text is a start position of a value of a Manufacturer-Organization, and a (k+1)-th classifier may indicate that the 25-th token of the text is an end position of the value of the Manufacturer-Organization.

5) The multi-pointer model obtains start and end positions obtained through a prediction, extracts and splices texts corresponding to the start and end positions, and finally performs an output.

According to the start and end positions obtained through the prediction at a previous layer, a final output of entity-attribute-attribute value is obtained through the combining and splicing. As in the above example, it is already predicted that the positions of Ship-Manufacturer are 1-3 and the positions of Manufacturer-Organization are 18-25. Thus, the final output of entity-attribute may be obtained as: X-Manufacturer-Company Z.

Finally, through the above steps, three different subject-predicate-object triples "X-Manufacturer-Company Z," "X-Producing Country-Country Y" and "X-Building Time-Jan. 24, 1899" may be extracted from the inputted short text sequence "the building of X was started by the company Z of Country Y on Jan. 24, 1899" in total.

6) Meanwhile, a multi-classification model (equivalent to the prediction sub-model in FIG. 4) of which the main part is a Softmax function is used to predict how many kinds of predication (abbreviated as P) relationships the inputted to-be-processed industry text involves. The finally obtained result is "3." It can be seen from the mutual verification that the prediction result is consistent with the actual situation of the actually extracted SPO triple sets.

Further, the above extracted subject-predicate-object triple sets may be added to a knowledge graph of the industry "Shipbuilding" and further satisfy the smart question answering initiated by a user. For example, when the query question initiated by the user is "Which country was X-ship made in" the answer "Country Y" may be directly returned through the knowledge recorded in the knowledge graph.

Figure 6:
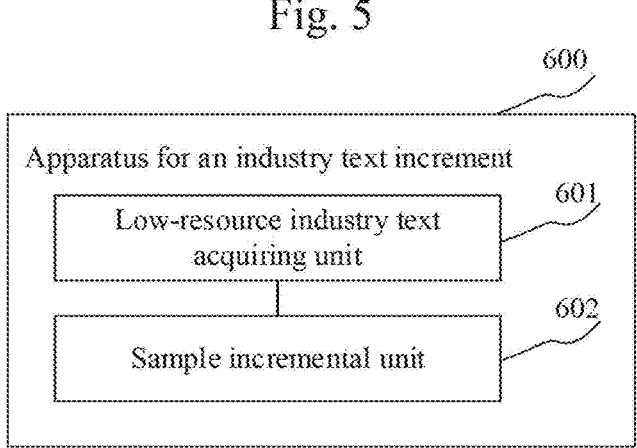
FIG. 6 is a structural block diagram of an apparatus for an industry text increment provided in an embodiment accord-ing to the present disclosure.

Further referring to FIG. 6, as an implementation of the method shown in the above figures, the present disclosure provides an embodiment of an apparatus for an industry text increment. The embodiment of the apparatus corresponds to the embodiment of the method shown in FIG. 2, and the apparatus may be applied to various electronic devices.

As shown in FIG. 6, the apparatus 600 for an industry text increment in this embodiment may include: a low-resource industry text acquiring unit 601 and a sample incremental unit 602. Here, the low-resource industry text acquiring unit 601 is configured to acquire an original industry text in a target industry field, an order of magnitude of a number of the original industry text being smaller than a preset first order of magnitude, wherein an industry text refers to a text content used to describe a specific object in a corresponding industry field. The sample incremental unit 602 is configured to perform a sample incremental processing on the original industry text by using a distant supervision method, to obtain increased industry texts, an order of magnitude of a number of the increased industry texts being greater than a preset second order of magnitude, wherein the preset second order of magnitude is not smaller than the preset first order of magnitude.

In this embodiment, for specific processes of the low-resource industry text acquiring unit 601 and the sample incremental unit 602 in the apparatus 600 for an industry text increment, and their technical effects, reference may be respectively to relevant descriptions of steps 201 and 202 in the corresponding embodiment of FIG. 2, which will not be repeatedly described herein.

In some alternative implementations of this embodiment, the sample incremental unit 602 may include a distantly supervised incremental subunit configured to perform the sample incremental processing on the original industry text by using the distant supervision method. The distantly supervised incremental subunit may be further configured to:

extract an initial subject-predicate-object triple set from the original industry text of the target industry field;

determine, in another industry text of a non-target industry field and a public corpus, a text having a subject and a predicate of the initial subject-predicate-object triple set as a target text; and use the target text as an added industry text of the original industry text distantly supervised.

In some alternative implementations of this embodiment, the sample incremental unit 602 may be further configured to:

perform a first sample incremental processing on the original industry text by using the distant supervision method, to obtain a first added industry text;

perform a second sample incremental processing on the original industry text and the first added industry text respectively by adopting a subject-object replacement method, which means a method that replaces an original subject and an original object with a new subject and a new object while maintaining the subject-object relationship provided by a predicate of a subject-predicate-object triple set, and/or a back translation method, to obtain a second added industry text; and remove a text having a content error, a text having a logic error and/or a duplicate text from the first added industry text and the second added industry text, to obtain the increased industry texts, the order of magnitude of the number of the increased industry texts being greater than the preset second order of magnitude.

In some alternative implementations of this embodiment, the apparatus 600 for an industry text increment may further include:

a language model training unit, configured to train a language model based on the increased industry texts, and obtain a trained language model; and a subject-predicate-object triple set extracting unit, configured to extract a subject-predicate-object triple set from an actual industry text by using the trained language model.

In some alternative implementations of this embodiment, the subject-predicate-object triple set extracting unit may be configured to:

input a to-be-processed industry text into the trained language model to obtain an outputted text vector containing a context feature;

extract a first result from the text vector by using a preset multi-pointer model, the multi-pointer model representing a corresponding relationship between the text vector and start and end positions of a relationship pair having a multi-layer nested relationship and existing in the text vector;

predict a second result from the text vector by using a preset prediction sub-model, the prediction sub-model being used to predict at least one of the number of predicate categories, the number of subject-predicate-object triple sets and an entity type that are contained in the to-be-processed industry text, according to a labeled label category; and weight the first result and the second result based on a preset model weighting coefficient, and extract a subject-predicate-object triple set from the integrated result after the weighting.

In some alternative implementations of this embodiment, the apparatus 600 for an industry text increment may further include:

a knowledge graph constructing unit, configured to construct a knowledge graph of the target industry field according to the extracted subject-predicate-object triple set.

In some alternative implementations of this embodiment, the apparatus 600 for an industry text increment may further include:

an actual industry field determining unit, configured to determine, in response to receiving a knowledge query request, an actual industry field to which the knowledge query request belongs according to the knowledge query request; and a knowledge-graph-based query and feedback unit, configured to invoke a knowledge graph of the actual industry field to perform a query, and feed back target knowledge corresponding to the knowledge query request.

This embodiment exists as an apparatus embodiment corresponding to the previous method embodiment. For the target industry field in which the stock of the original industry text is lower than the preset first order of magnitude, the apparatus for an industry text increment provided in the embodiment of the present disclosure may implement the sample increment by the distant supervision method.

Through the distant supervision method, a new text meeting the requirement can be found from another industry field or a public corpus according to an association between nouns in the original industry text, and the new text is used as an added text, thus expanding the sample in magnitude. Accordingly, with the help of a sample incremental technique, a model used to precisely extract a subject-predicate-object triple set and having a precision satisfying a requirement can also be trained through the text of the low-resource target industry.

According to an embodiment of the present disclosure, the present disclosure further provides an electronic device and a readable storage medium.

Figure 7:
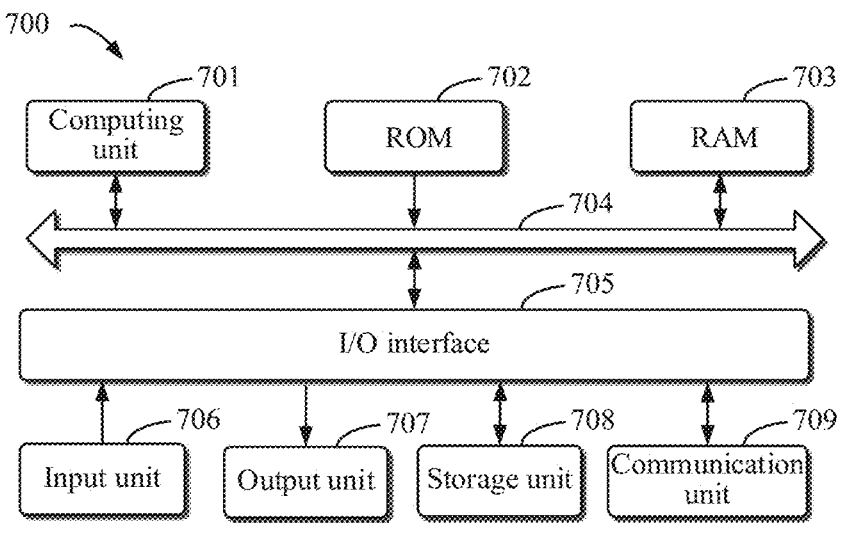
FIG. 7 is a schematic structural diagram of an electronic device adapted to perform the method for an industry text increment, provided in an embodiment according to the present disclosure.

FIG. 7 is a schematic block diagram of an exemplary electronic device 700 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The components shown herein, their connections and relationships, and their functions are only as examples, and not intended to limit implementations of the present disclosure as described and/or claimed herein.

As shown in FIG. 7, the electronic device 700 includes a computation unit 701, which may execute various appropriate actions and processes in accordance with a computer program stored in a read-only memory (ROM) 702 or a computer program loaded into a random access memory (RAM) 703 from a storage unit 708. The RAM 703 may alternatively store various programs and data required by operations of the device 700. The computation unit 701, the ROM 702 and the RAM 703 are connected to each other through a bus 704. An input/output (I/O) interface 705 is also connected to the bus 704.

Multiple components of the device 700 are connected to the I/O interface 705, and include: an input unit 706, such as a keyboard and a mouse; an output unit 707, such as various types of displays and a speaker; a storage unit 708, such as a magnetic disk and an optical disk; and a communication unit 709, such as a network card, a modem and a wireless communication transceiver. The communication unit 709 allows the device 700 to exchange information or data with other devices through a computer network, such as the Internet and/or various telecommunications networks.

The computing unit 701 may be various general-purpose and/or specific-purpose processing components having processing and computing capabilities. Some examples of the computing unit 701 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 701 performs various methods and processing described above, such as the method for an industry text increment. For example, in some embodiments, the method for an industry text increment may be implemented as a computer software program, which is tangibly included in a machine-readable medium, such as the storage unit 708. In some embodiments, part or all of the computer program may be loaded and/or installed on the device 700 through the ROM 702 and/or the communication unit 709. When the computer program is loaded into the RAM 703 and executed by the computing unit 701, one or more steps of the method for an industry text increment described above may be performed. Alternatively, in other embodiments, the computing unit 701 may be configured to perform the method for an industry text increment in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of the present disclosure may be written in any combination of one or more programming languages. These program codes may be provided to a processor or controller used in a computer of general-purpose or specific-purpose or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer that comprises a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in a computing system including a background component (such as a data server), a computing system including a middleware component (such as an application server), a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in a cloud computing service system and may solve the defects of difficult management and weak service scalability existing in a conventional physical host and a VPS (Virtual Private Server) service.

For a target industry field in which a stock of an original industry text is lower than a preset first order of magnitude, in the embodiments of the present disclosure, sample increment is implemented by using a distant supervision method. Through the distant supervision method, a new text meeting a requirement can be found from another industry field or a public corpus according to an association between nouns in the original industry text, and the new text is used as an added text, and thus the sample magnitude is expanded. Accordingly, with the help of a sample incremental technology, a model used to precisely extract a subject-predicate-object triple set and having a precision satisfying a requirement can also be trained through a text of a low-resource target industry.

It should be appreciated that the steps of reordering, adding or deleting may be executed using the various forms described above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for an industry text increment, comprising:
    acquiring an original industry text in a target industry field, an order of magnitude of a number of the original industry text being smaller than a preset first order of magnitude, wherein an industry text refers to a text content used to describe a specific object in a corresponding industry field; and
    performing a sample incremental processing on the original industry text by using a distant supervision method, to obtain increased industry texts, an order of magnitude of a number of the increased industry texts being greater than a preset second order of magnitude, wherein the preset second order of magnitude is not smaller than the preset first order of magnitude, wherein the performing a sample incremental processing on the original industry text by using a distant supervision method, to obtain increased industry texts, an order of magnitude of a number of the increased industry texts is greater than a preset second order of magnitude, comprises:
    performing a first sample incremental processing on the original industry text by using the distant supervision method, to obtain a first added industry text;
    performing a second sample incremental processing on the original industry text and the first added industry text respectively by adopting a subject-object replacement method, to obtain a second added industry text, the subject-object replacement method comprising replacing an original subject and an original object with a new subject and a new object while maintaining a subject-object relationship provided by a predicate of a subject-predicate-object triple set; and
    removing a text having a content error, a text having a logic error and a duplicate text from the first added industry text and the second added industry text, to obtain the increased industry texts, the order of magnitude of the number of the increased industry texts is greater than the preset second order of magnitude,
    wherein if the order of magnitude of the number of the increased industry texts after the text having the content error, the text having the logic error and the duplicate text are removed, is not greater than the preset second order of magnitude, the sample incremental processing is performed on the increased industry texts again, until the order of magnitude of the number of the increased industry texts is greater than the preset second order of magnitude,
    wherein the method further comprises:
    training a language model based on the increased industry texts, and obtaining a trained language model;
    extracting a subject-predicate-object triple set from an actual industry text by using the trained language model;
    constructing a knowledge graph of a target industry field according to the extracted subject-predicate-object triple set, wherein the subject-predicate-object triple set comprises a plurality of subject-predicate-object triples; and
    performing a query by using the knowledge graph constructed according to the subject-predicate-object triple set.

2. The method according to claim 1, wherein the performing a sample incremental processing on the original industry text by using a distant supervision method comprises:
    extracting an initial subject-predicate-object triple set from the original industry text of the target industry field;
    determining, in an another industry text of a non-target industry field and a public corpus, a text having a subject and a predicate of the initial subject-predicate-object triple set as a target text; and using the target text as an added industry text of the original industry text distantly supervised.

3. The method according to claim 1, wherein the extracting a subject-predicate-object triple set from an actual industry text by using the trained language model comprises:

inputting a to-be-processed industry text into the trained language model to obtain an outputted text vector containing a context feature;

extracting a first result from the text vector by using a preset multi-pointer model, the multi-pointer model representing a corresponding relationship between the text vector and start and end positions of a relationship pair having a multi-layer nested relationship and existing in the text vector;

predicting a second result from the text vector by using a preset prediction sub-model, the prediction sub-model being used to predict at least one of a number of predicate categories, a number of subject-predicate-object triple sets or an entity type, contained in the to-be-processed industry text, according to a labeled label category; and weighting the first result and the second result based on a preset model weighting coefficient, and extracting the subject-predicate-object triple set from an integrated result after the weighting.

4. The method according to claim 1, further comprising:

determining, in response to receiving a knowledge query request, an actual industry field to which the knowledge query request belongs according to the knowledge query request; and invoking the knowledge graph of the actual industry field to perform a query, and feeding back target knowledge corresponding to the knowledge query request.

5. An electronic device, comprising:

at least one processor; and a storage device, communicated with the at least one processor, wherein the storage device stores instructions executable by the at least one processor, and the instructions are executed by the at least one processor, to enable the at least one processor to perform operations comprising:

acquiring an original industry text in a target industry field, an order of magnitude of a number of the original industry text being smaller than a preset first order of magnitude, wherein an industry text refers to a text content used to describe a specific object in a corresponding industry field; and performing a sample incremental processing on the original industry text by using a distant supervision method, to obtain increased industry texts, an order of magnitude of a number of the increased industry texts being greater than a preset second order of magnitude, wherein the preset second order of magnitude is not smaller than the preset first order of magnitude, wherein the performing a sample incremental processing on the original industry text by using a distant supervision method, to obtain increased industry texts, an order of magnitude of a number of the increased industry texts is greater than a preset second order of magnitude, comprises:

performing a first sample incremental processing on the original industry text by using the distant supervision method, to obtain a first added industry text;

performing a second sample incremental processing on the original industry text and the first added industry text respectively by adopting a subject-object replacement method, to obtain a second added industry text, the subject-object replacement method comprising replacing an original subject and an original object with a new subject and a new object while maintaining a subject-object relationship provided by a predicate of a subject-predicate-object triple set; and removing a text having a content error, a text having a logic error and a duplicate text from the first added industry text and the second added industry text, to obtain the increased industry texts, the order of magnitude of the number of the increased industry texts is greater than the preset second order of magnitude, wherein if the order of magnitude of the number of the increased industry texts after the text having the content error, the text having the logic error and the duplicate text are removed, is not greater than the preset second order of magnitude, the sample incremental processing is performed on the increased industry texts again, until the order of magnitude of the number of the increased industry texts is greater than the preset second order of magnitude, wherein the method further comprises:

training a language model based on the increased industry texts, and obtaining a trained language model;

extracting a subject-predicate-object triple set from an actual industry text by using the trained language model;

constructing a knowledge graph of a target industry field according to the extracted subject-predicate-object triple set, wherein the subject-predicate-object triple set comprises a plurality of subject-predicate-object triples; and performing a query by using the knowledge graph constructed according to the subject-predicate-object triple set.

6. The electronic device according to claim 5, wherein the performing a sample incremental processing on the original industry text by using a distant supervision method comprises:

extracting an initial subject-predicate-object triple set from the original industry text of the target industry field;

determining, in another industry text of a non-target industry field and a public corpus, a text having a subject and a predicate of the initial subject-predicate-object triple set as a target text; and using the target text as an added industry text of the original industry text distantly supervised.

7. The electronic device according to claim 5, wherein the extracting a subject-predicate-object triple set from an actual industry text by using the trained language model comprises:

inputting a to-be-processed industry text into the trained language model to obtain an outputted text vector containing a context feature;

extracting a first result from the text vector by using a preset multi-pointer model, the multi-pointer model representing a corresponding relationship between the text vector and start and end positions of a relationship pair having a multi-layer nested relationship and existing in the text vector;

predicting a second result from the text vector by using a preset prediction sub-model, the prediction sub-model being used to predict at least one of a number of predicate categories, a number of subject-predicate-object triple sets or an entity type, contained in the to-be-processed industry text, according to a labeled label category; and weighting the first result and the second result based on a
preset model weighting coefficient, and extracting the
subject-predicate-object triple set from an integrated
result after the weighting.

8. The electronic device according to claim 5, further
comprising:
   determining, in response to receiving a knowledge query
request, an actual industry field to which the knowledge
query request belongs according to the knowledge
query request; and
   invoking the knowledge graph of the actual industry field
to perform a query, and feeding back target knowledge
corresponding to the knowledge query request.

9. A non-transitory computer readable storage medium,
storing computer instructions, wherein the computer instruc-
tions, when executed by a computer, cause the computer to
perform operations comprising:
   acquiring an original industry text in a target industry
field, an order of magnitude of a number of the original
industry text being smaller than a preset first order of
magnitude, wherein an industry text refers to a text
content used to describe a specific object in a corre-
sponding industry field; and
   performing a sample incremental processing on the origi-
nal industry text by using a distant supervision method,
to obtain increased industry texts, an order of magni-
tude of a number of the increased industry texts being
greater than a preset second order of magnitude,
wherein the preset second order of magnitude is not
smaller than the preset first order of magnitude,
wherein the performing a sample incremental process-
ing on the original industry text by using a distant
supervision method, to obtain increased industry texts,
an order of magnitude of a number of the increased
industry texts is greater than a preset second order of
magnitude, comprises:
   performing a first sample incremental processing on the
original industry text by using the distant supervision
method, to obtain a first added industry text;
   performing a second sample incremental processing on
the original industry text and the first added industry
text respectively by adopting a subject-object replace-
ment method, to obtain a second added industry text,
the subject-object replacement method comprising
replacing an original subject and an original object with
a new subject and a new object while maintaining a
subject-object relationship provided by a predicate of a
subject-predicate-object triple set; and
   removing a text having a content error, a text having a
logic error and a duplicate text from the first added
industry text and the second added industry text, to
obtain the increased industry texts, the order of mag-
nitude of the number of the increased industry texts is
greater than the preset second order of magnitude,
wherein if the order of magnitude of the number of the
increased industry texts after the text having the content
error, the text having the logic error and the duplicate
text are removed, is not greater than the preset second order of magnitude, the sample incremental processing
is performed on the increased industry texts again, until
the order of magnitude of the number of the increased
industry texts is greater than the preset second order of
magnitude,
wherein the method further comprises:
training a language model based on the increased industry
texts, and obtaining a trained language model;
extracting a subject-predicate-object triple set from an
actual industry text by using the trained language
model;
constructing a knowledge graph of a target industry field
according to the extracted subject-predicate-object
triple set, wherein the subject-predicate-object triple set
comprises a plurality of subject-predicate-object
triples; and
performing a query by using the knowledge graph con-
structed according to the subject-predicate-object triple
set.

10. The storage medium according to claim 9, wherein the
performing a sample incremental processing on the original
industry text by using a distant supervision method com-
prises:
   extracting an initial subject-predicate-object triple set
from the original industry text of the target industry
field;
   determining, in another industry text of a non-target
industry field and a public corpus, a text having a
subject and a predicate of the initial subject-predicate-
object triple set as a target text; and
   using the target text as an added industry text of the
original industry text distantly supervised.

11. The storage medium according to claim 10, wherein
the extracting a subject-predicate-object triple set from an
actual industry text by using the trained language model
comprises:
   inputting a to-be-processed industry text into the trained
language model to obtain an outputted text vector
containing a context feature;
   extracting a first result from the text vector by using a
preset multi-pointer model, the multi-pointer model
representing a corresponding relationship between the
text vector and start and end positions of a relationship
pair having a multi-layer nested relationship and exist-
ing in the text vector;
   predicting a second result from the text vector by using a
preset prediction sub-model, the prediction sub-model
being used to predict at least one of a number of
predicate categories, a number of subject-predicate-
object triple sets or an entity type, contained in the
to-be-processed industry text, according to a labeled
label category; and
   weighting the first result and the second result based on a
preset model weighting coefficient, and extracting the
subject-predicate-object triple set from an integrated
result after the weighting.

* * * * *